United States Patent
Rothaus et al.

(10) Patent No.: US 9,479,837 B1
(45) Date of Patent: Oct. 25, 2016

(54) SYSTEMS AND METHODS FOR MANAGING TELEVISION TUNERS

(71) Applicant: The DIRECTV Group, Inc., El Segundo, CA (US)

(72) Inventors: Robert J. Rothaus, Placentia, CA (US); Scott W. Hause, Altadena, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/586,245

(22) Filed: Dec. 30, 2014

(51) Int. Cl.
| | |
|---|---|
| G06F 3/00 | (2006.01) |
| G06F 13/00 | (2006.01) |
| H04N 5/445 | (2011.01) |
| H04N 7/20 | (2006.01) |
| H04N 21/482 | (2011.01) |
| H04N 21/61 | (2011.01) |

(52) U.S. Cl.
CPC ........ *H04N 21/482* (2013.01); *H04N 21/6168* (2013.01); *H04N 21/6193* (2013.01)

(58) Field of Classification Search
None
See application file for complete search history.

(56) References Cited

U.S. PATENT DOCUMENTS

| | | | | |
|---|---|---|---|---|
| 6,133,910 | A * | 10/2000 | Stinebruner | H04N 5/4401 348/731 |
| 6,247,158 | B1 * | 6/2001 | Smallcomb | H04B 7/02 714/786 |
| 6,286,058 | B1 * | 9/2001 | Hrastar | H04L 12/2801 709/218 |
| 6,486,925 | B1 * | 11/2002 | Ko | H04N 5/4401 348/465 |
| 6,778,810 | B1 * | 8/2004 | Anderson | H01Q 1/52 342/359 |
| 7,194,753 | B1 * | 3/2007 | Fries | H03J 1/0075 348/552 |
| 2002/0184637 | A1 * | 12/2002 | Perlman | H04L 63/0428 725/87 |
| 2005/0260948 | A1 * | 11/2005 | Regulinski | H04B 7/18513 455/12.1 |
| 2005/0289593 | A1 * | 12/2005 | Spilo | H04N 5/44543 725/45 |
| 2006/0136968 | A1 * | 6/2006 | Han | H04N 21/4263 725/71 |
| 2007/0049192 | A1 * | 3/2007 | Hoffmann | H04H 20/63 455/3.02 |
| 2007/0058083 | A1 * | 3/2007 | Kim | H04N 5/50 348/725 |
| 2011/0234906 | A1 * | 9/2011 | Jackson | H04N 5/46 348/555 |
| 2012/0131605 | A1 * | 5/2012 | Aoki | H04N 5/44543 725/27 |

* cited by examiner

*Primary Examiner* — Nathan Flynn
*Assistant Examiner* — William J Kim
(74) *Attorney, Agent, or Firm* — Guntin & Gust, PLC; Ralph Trementozzi

(57) ABSTRACT

Example methods and systems are disclosed for managing television tuners. A method includes receiving a request to tune to a first channel of a plurality of television channels including one or more local channels and one or more satellite channels, and determining whether the first channel is one of the local channel(s). If it is determined that the first channel is one of the local channel(s), the method includes determining whether at least one of one or more local tuners is available for tuning. If it is determined that at least one local tuner is available, the method includes tuning to the first channel using an available local tuner. If it is determined that none of the local tuner(s) are available, the method includes tuning to the first channel using an available one of one or more satellite tuners.

20 Claims, 4 Drawing Sheets

SYSTEMS AND METHODS FOR MANAGING TELEVISION TUNERS

TECHNICAL FIELD

The present disclosure relates generally to a system and method for processing and delivery television content and, more particularly, to a system and a method for managing television tuners.

BACKGROUND

Generally, television content is broadcast via over-the-air, cable, or satellite systems using signals incorporating content for multiple channels. To watch or record the content for any one particular channel, a television tuner is employed. The television tuner tunes a set top box or a television to the desired channel to allow the content for that channel to be watched in real time or recorded (e.g., via a digital video recorder). If a user wishes to watch or record content for multiple channels at the same time (e.g., watching one channel while recording another), the set top box or television would require at least two television tuners. That is, the number of channels that can be utilized at the same time is limited to the number of television tuners available for tuning.

SUMMARY

Terrestrial television systems were the first to broadcast television content. The television content was broadcast over-the-air and received by an end user using an over-the-air antenna. Receiving television content in this manner has always been and continues to be free. That is, the end user does not pay the broadcast company or any other third party for the transmission and viewing of the content received via the over-the-air antenna. The content available via the over-the-air transmission is typically referred to as "local content" or "local channels."

Nowadays, however, the local channels provide only a subset of the total amount of television content that is available to a user. To receive additional channels (e.g., subscription channels) providing additional content, many users choose to receive television content from subscription television sources such as, for example, cable television providers, satellite television providers, internet television providers, etc. For the convenience of the user, these subscription television sources often provide the local channels in addition to the subscription channels (e.g., satellite channels, cable channels, internet channels, etc.) to the user. Yet, when the local channels are transmitted to an end user via the subscription television source (e.g., via a satellite as opposed to an over-the-air antenna), the broadcast companies charge the subscription television source a retransmission fee. The retransmission fees increase the cost of providing television service to the end user, which in turn increases the price the end user must pay for the subscription television source to be able to provide the user with televisions services.

The present disclosure provides a system and method that advantageously reduces retransmission fees by more optimally managing the use of television tuners. In particular, example embodiments of the present disclosure provide systems and processes that manage tuner resources in a manner that can prioritize the use of local tuners (i.e., also referred to as "off-air tuners" or "over-the-air tuners") over other tuners associated with the subscription television source (e.g., satellite tuners, cable tuners, etc.) for tuning to local content. Additionally, example embodiments of the present disclosure provide an improved user interface for facilitating selection of local content in connection with the more optimal management of tuner resources.

According to some aspects of the present disclosure, a method includes receiving, by a television receiving system, a request to tune to a first channel of a plurality of television channels, which include one or more local channels and one or more satellite channels. The method also includes determining whether the first channel is one of the one or more one local channels and, if it is determined that the first channel is one of the one or more local channels, determining whether at least one of one or more local tuners is available for tuning. If it is determined that at least one local tuner is available for tuning, then the method includes tuning to the first channel using an available one of the one or more local tuners. If it is determined that none of the one or more local tuners are available for tuning, then the method includes determining whether at least one of one of one or more satellite tuners is available for tuning. If it is determined that none of the local tuners is available for tuning and at least one of the satellite tuners is available for tuning, then the method includes tuning to the first channel using an available one of the one or more satellite tuners. On the other hand, if none of the one or more local tuners and none of the one or more satellite tuners are available for tuning, then the method includes generating an error signal.

According to additional aspects of the present disclosure, a system for television tuner management includes one or more satellite tuners configured to receive a plurality of television channels from a satellite antenna. The plurality of television channels includes one or more local channels and one or more satellite channels. The system also includes one or more local tuners configured to receive the one or more local channels from an over-the-air antenna, one or more processors, one or more memory storing program instructions, which when executed by the one or more processors, cause the system to receive a request to tune to a first channel of the plurality of television channels. The instructions further cause the system to determine whether the first channel is one of the one or more one local channels and, if it is determined that the first channel is one of the one or more local channels, determine whether at least one of the one or more local tuners is available for tuning. If it is determined that at least one local tuner is available for tuning, then the instructions further cause the system to tune to the first channel using an available one of the one or more local tuners. If it is determined that none of the one or more local tuners are available for tuning, then the instructions further cause the system to tune to the first channel using an available one of the one or more satellite tuners.

According to additional aspects of the present disclosure, a system for television tuner management includes one or more subscription tuners configured to receive a plurality of television channels from a first television broadcast system. The plurality of television channels includes one or more local channels and one or more subscription channels. The system also includes one or more local tuners configured to receive the one or more local channels from a second television broadcast system different from the first television broadcast system, one or more processors, and one or more memory storing program instructions, which when executed by the one or more processors, cause the system to receive a request to tune to a first channel of the plurality of television channels. The instructions further cause the system to determine whether the first channel is one of the one or more one local channels and, if it is determined that the first channel is one of the one or more local channels, determine whether at least one of the one or more local tuners is available for tuning. If it is determined that at least one local tuner is available for tuning, then the instructions further cause the system to tune to the first channel using an available one of the one or more local tuners. If it is determined that none of the one or more local tuners are available for tuning, then the instructions further cause the system to determine whether at last one of the one or more subscription tuners is available for tuning. If it is determined that at least one of the subscription tuners is available for tuning, then the instructions further cause the system to tune to the first channel using an available one of the one or more subscription tuners. If it is determined that none of the one or more subscription tuners is available for tuning, then the instructions further cause the system to generate an error signal.

These as well as other aspects, advantages, and alternatives, will become apparent to those of ordinary skill in the art by reading the following detailed description, with reference where appropriate to the accompanying drawings.

While the systems and processes of the present disclosure are susceptible to various modifications and alternative forms, specific embodiments have been shown by way of example in the Figures and will be described in detail herein. It should be understood, however, that the systems and processes of the present disclosure are not intended to be limited to the particular forms disclosed. Those skilled in the art will understand that modifications, equivalents, and alternatives falling within the spirit and scope of the appended claims are possible. For example, it should be understood that other embodiments may include more or less of each element shown in a given Figure. Further, some of the illustrated elements may be combined or omitted. Yet further, an example embodiment may include elements that are not illustrated in the Figures. Other variations and examples are also possible.

DETAILED DESCRIPTION

The following detailed description describes various features and functions of the disclosed systems and methods with reference to the accompanying Figures. In the Figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

While the following disclosure is made with respect to example satellite broadcast services and systems, it should be understood that other delivery systems for other subscription television services (e.g., cable television broadcast systems, internet television broadcast systems, etc.) are readily applicable to the disclosed systems and methods. In one non-limiting example, according to alternative aspects of the present disclosure, the satellite broadcast systems, satellite channels, and satellite tuners can be replaced with other subscription broadcast systems (e.g., a cable broadcast system), subscription channels (e.g., cable channels), and subscription tuners (e.g., cable tuners), respectively. Additional example implementations are described further below. In general, the systems and methods of the present disclosure are applicable to any system in which (i) one or more subscription channels and one or more local channels are received via a first broadcast system (e.g., including satellite, cable, internet, etc.) and processed using one or more associated first tuners, and (ii) one or more local channels are separately received via a second broadcast system (e.g., a terrestrial, over-the-air system) and processed using one or more associated second tuners.

Figure 1:
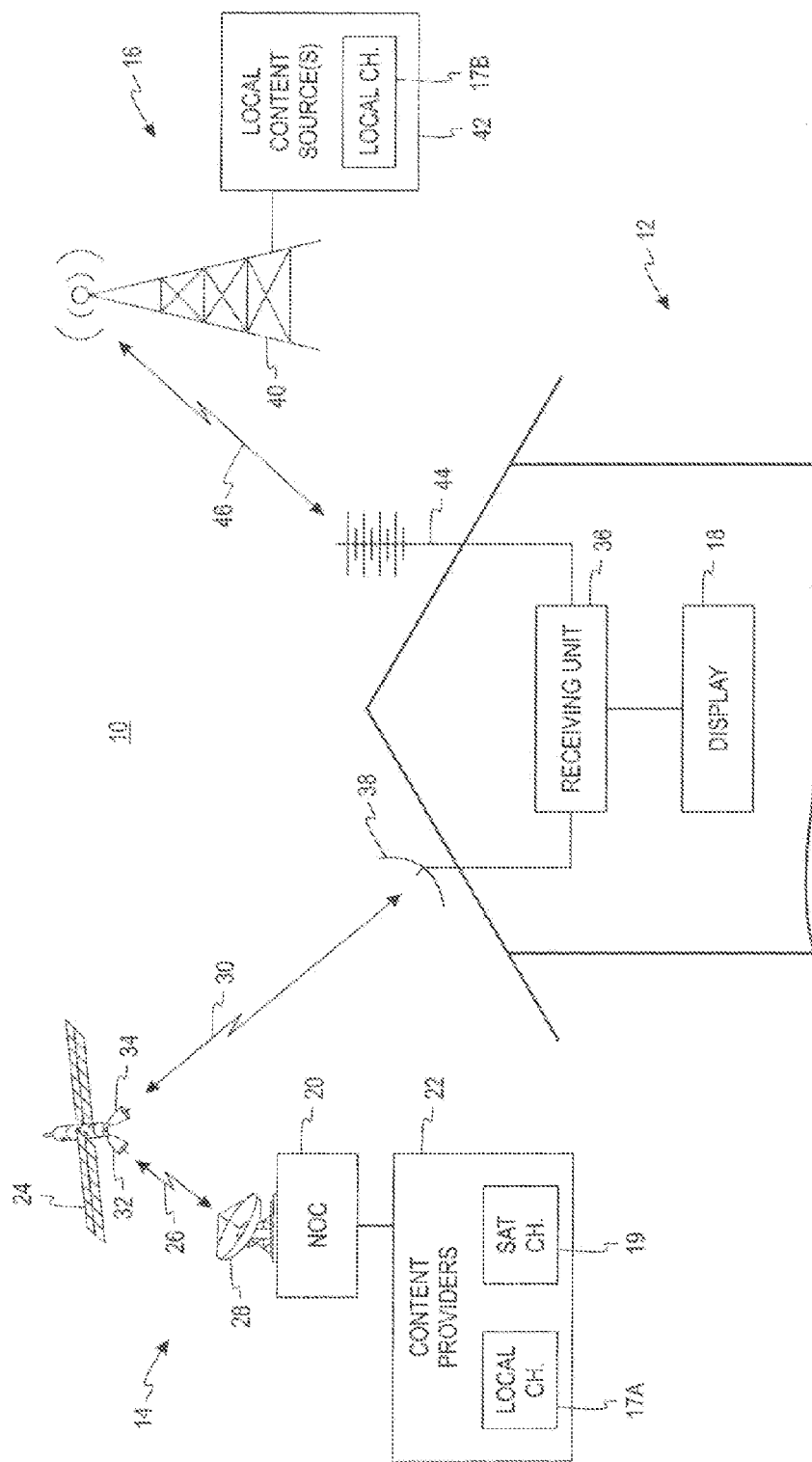
FIG. 1 illustrates an example television broadcast system according to aspects of the present disclosure.

Referring now to FIG. 1, an example television broadcasting system 10 is illustrated according to some aspects of the present disclosure. The illustrated system 10 includes a receiving system 12 that is communicatively coupled to a first television broadcast system 14 and a second television broadcast system 16. In the illustrated example, the first television broadcast system 14 is a satellite television broadcast system and the second television broadcast system 16 is a terrestrial, over-the-air television broadcast system. The first television broadcast system 14 is configured to provide a plurality of television channels to the receiving system 12, including a first set of local channel(s) 17A and one or more satellite channels 19. The second television broadcast system 16 is configured to provide a second set of local channel(s) 17B to the receiving system 12. Once received, the receiving system 12 displays on a display device 18 and/or records (e.g. via a DVR) selected ones of the local channels 17A, 17B and/or the satellite channels 19 as described further below.

The television content provided by the local channels 17A, 17B and the satellite channels 19 can include, for example, television programs, movies, sporting events, news, traffic, weather, advertisements, combinations thereof, and/or the like. Additionally, it should be understood that the television content can be in standard definition, high definition, ultra-high definition, three-dimensional television, combinations thereof, and/or the like.

According to some aspects, the first set of local channels 17A can be the exactly same as the second set of local channels 17B such that all of the local channels 17A, 17B are received by the receiving system 12 from both the first broadcast system 14 and the second broadcast system 16. According to alternative aspects, the first set of local channels 17A can differ from the second set of local channels 17B such that the first set of local channels 17A can include one or more channels omitted from the second set of local channels 17B and/or vice versa.

The first broadcast system 14 includes a network operations center (NOC) 20 that is communicatively coupled to one or more content providers 22. The one or more content providers 22 provide the television content for the local channels 17A and the satellite channels 19 to the NOC 20 for distribution to the receiving system 12 via a satellite 24. Accordingly, the NOC 20 may also be referred to as a head end. The television content can be provided by the content providers 22 to the NOC 20 as live feeds and/or recorded material. The one or more content providers 22 can thus provide signals and/or media, which are received by the NOC 20.

The NOC 20 processes the television content received from the one or more content providers 22 and generates uplink signals 26 communicating the television content to the satellite 24. To transmit the uplink signals 26 generated by the NOC 20, the NOC 20 includes an NOC antenna 28. The uplink signals 26 can be wireless communications signals including, for example, digital data, digital video, and/or digital audio signals for communicating the program content to the satellite 24.

The satellite 24 can be a high altitude device (e.g., a space-based satellite) that is configured to receive the uplink signals 26 from the NOC 20 and transmit downlink signals 30 to the receiving system 12. In particular, the satellite 24 includes an uplink-receiving antenna 32 configured to receive the uplink signals 26 from the NOC 20 and a downlink antenna 34 configured to transmit the downlink signals 30 generated by the satellite 24 in response to the uplink signals 26. The downlink signals 30 can be wireless communication signals that generally correspond in content to the uplink signals 26.

As shown in FIG. 1, the receiving system 12 includes a receiver unit 36 communicatively coupled to a satellite antenna 38 and the display device 18. The downlink signals 30 transmitted by the downlink antenna 34 of the satellite 24 are received by the receiver unit 36 via the satellite antenna 38. The satellite antenna 38 can include one or more low noise blocks downconverters (LNB) associated therewith. According to some aspects, the satellite antenna 38 can include a single antenna for receiving the downlink signals 30. According to other aspects, the satellite antenna 38 can include a plurality of antennas for different orbital slots. In one non-limiting example, the satellite antenna 38 can include an outdoor parabolic reflector antenna. In another non-limiting example, the satellite antenna 38 can include an internal controller for controlling rotation of the satellite antenna 38 to track movement of the satellite 24. The receiver unit 36 processes the downlink signals 30 and outputs selected television content for display on the display device 18 (e.g., a television, a computer monitor, etc.) and/or for recordation (e.g., via a DVR) as described further below.

The second broadcast system 14 includes one or more terrestrial antennas 40 that are configured to transmit the television content for the local channels 17B via over-the-air communications signals 46. The television content for the local channels 17B is provided to the terrestrial antenna(s) 40 by one or more local content sources 42. To receive the over-the-air communications signals 46, the receiving system 12 further includes an over-the-air antenna 44. The over-the-air antenna 44 is communicatively coupled to the receiver unit 36, which receives and processes the over-the-air communications signals 46 for display and/or recording. Although the over-the-air antenna 44 is illustrated as being separate and distinct from the satellite antenna 38, it should be understood that the over-the-air antenna 44 used for receiving over-the air signals 46 can be physically combined with satellite antenna 38 according to some additional or alterative aspects of the present disclosure.

According to some aspects of the present disclosure, the over-the-air content can be broadcast over the air in an Advanced Television System Committee (ATSC) content format from an ATSC content source 48. According to additional or alternative aspects, the over-the-air content may also be in other formats such as, for example, NTSC format, ISDB-T and DVB-T/DVB-T2/DVB-H.

According to some aspects of the present disclosure, the receiving system 12 can be disposed in a stationary structure. For example, the receiving system 12 can be in a single family dwelling (as illustrated in the example of FIG. 1), a multi-unit dwelling, a commercial building, a hotel, etc. According to other aspects, the receiving system 12 can be disposed in a mobile structure. For example, the receiving system 12 can be in a vehicle, a laptop computer, a personal digital assistant, a cellular telephone, a portable satellite receiver such as the SAT-GO® system provided by DIRECTV®, etc.

Figure 2:
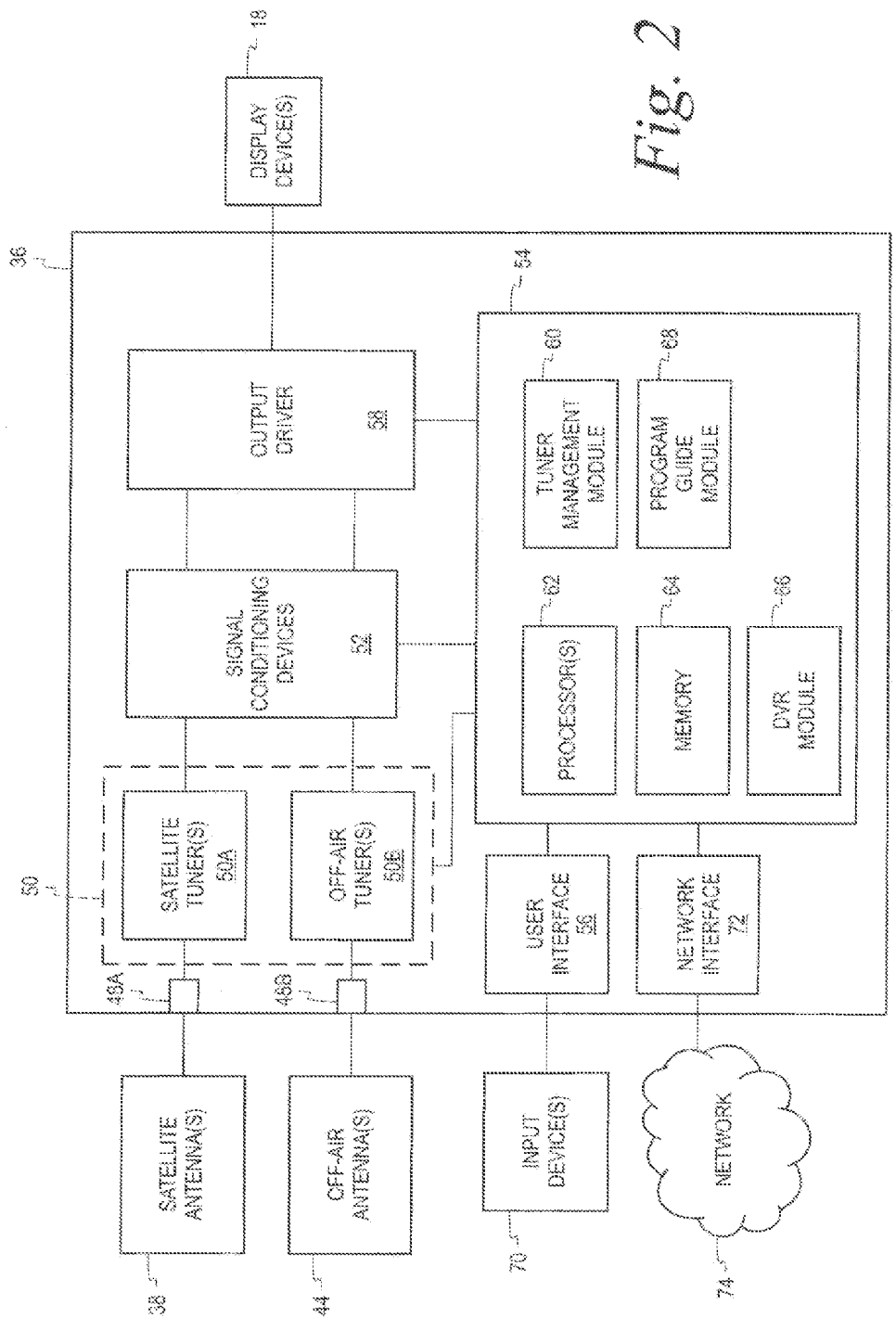
FIG. 2 illustrates an example receiver unit according to aspects of the present disclosure.

Referring now to FIG. 2, an example receiver unit 36 is illustrated according to some aspects of the present disclosure. The receiver unit 36 can take a variety of forms. For example, the receiver unit 36 can be a set top box, a smartphone, a personal computer, a laptop computer, a tablet computer, a personal digital assistant (PDA), a portable media player, or the like.

The receiver unit 36 includes a plurality of inputs 48A, 48B, a plurality of tuners 50, a plurality of signal conditioning devices 52, a computing system 54, a user interface 56, and an output driver 58. Although a particular configuration of receiver unit 36 is illustrated, the configuration is merely representative of various possible receiver unit 36 configurations. For example, although the display device 18 is illustrated as being separate from the receiver unit 36, the display device 18 and the receiver unit 36 can be incorporated in the same device. The components described with reference to FIG. 2 can be communicatively linked by a system bus, network, or other connection mechanism.

The first input 48A is communicatively coupled to the satellite antenna 38 and the second input 48B is communicatively coupled to the over-the-air antenna 44. Accordingly, the receiver unit 36 is configured to receive the satellite channels 19 and the local channels 17A from the satellite antenna 38 via a first input 48A and the receiver unit 36 is configured to receive the local channels 17B from the over-the-air antenna 44 via the second input 48B.

The receiver unit 36 further includes a plurality of tuners 50 for selectively tuning to one or more of the satellite channels 19 and the local channels 17A, 17B. In particular, the receiver unit 36 includes one or more satellite tuners 50A communicatively coupled to the first input 48A and one or more local tuners 50B communicatively coupled to the second input 48B. Accordingly, the one or more satellite tuners 50A are configured to tune to the local and satellite channels 17A, 19 received from the first broadcast system 14 (via the satellite antenna 38) and the one or more local tuners 50B are configured to tune to the local channels 17B received from the second broadcast system 16 (via the over-the-air antenna 44). For purposes of the present disclosure, tuning to a local channel 17A, 17B or a satellite channel 19 involves utilizing one of the tuners 50 (e.g., in conjunction with other signal conditioning devices 52) to display and/or record the television content associated with a requested local channel 17A, 17B or satellite channel 19.

It should be understood that the tuners 50 can include any number of satellite tuners 50A and any number of local tuners 50B. In one non-limiting example, the receiver unit 36 includes five satellite tuners 50A and two local tuners 50B. In another non-limiting example, the receiver unit 36 includes two or more satellite tuners 50A and one local tuner 50B. Other examples are contemplated.

Each of the tuners 50A, 50B can be further communicatively coupled to one or more signal conditioning devices 52. For example, the signal conditioning devices 52 can include a demodulator, a forward error decoder, and/or a PID filter communicatively coupled to each of the tuners 50A, 50B for demodulating and selecting the signals for the channels 17A, 17B, 19 tuned by the tuners 50A, 50B. The processed signals (e.g., the demodulated and decoded signals) are communicated to the computing system 54 or the output driver 62; however, other examples are also possible.

The computing system 54 is configured to process information and control various aspects of the receiver unit 36. For example, in the computing system 54 shown in FIG. 2, a tuner management module 60 processes a request to tune to a particular channel and controls which of the tuners 50A, 50B is utilized for such requests, as will be described below. Additionally, for example, the computing system 54 can also include an electronic program guide module 68 for providing an interactive user interface related to the television content and scheduling information therefore. The computing system 54 can also include a digital video recorder (DVR) module 66 for storing and subsequent playback of television content.

These modules 60, 66, 68 and other aspects of the computing system 54 can be implemented by one or more processors 62 and/or memory devices 64. The processor(s) 62 of the computing system 54 can be implemented as a combination of hardware and software elements. The hardware elements can include combinations of operatively coupled hardware components, including microprocessors, communication/networking interfaces, memory, signal filters, circuitry, etc. The processors 62 can be configured to perform operations specified by the software elements, e.g., computer-executable code stored on computer readable medium 64. The processors 62 can be implemented in any device, system, or subsystem to provide functionality and operation according to the present disclosure. The processors 62 can be implemented in any number of physical devices/machines. For example, parts of the processing of the example embodiments can be distributed over any combination of processors 62 for better performance, reliability, cost, etc.

The physical devices/machines can be implemented by the preparation of integrated circuits or by interconnecting an appropriate network of conventional component circuits, as is appreciated by those skilled in the electrical art(s). The physical devices/machines, for example, may include field programmable gate arrays (FPGA's), application-specific integrated circuits (ASIC's), digital signal processors (DSP's), etc. The physical devices/machines may reside on a wired or wireless network, e.g., LAN, WAN, Internet, cloud, near-field communications, etc., to communicate with each other and/or other systems, e.g., Internet/web resources.

Appropriate software can be readily prepared by programmers of ordinary skill based on the teachings of the example embodiments, as is appreciated by those skilled in the software arts. Thus, the example embodiments are not limited to any specific combination of hardware circuitry and/or software. Stored on one computer readable medium 64 or a combination of computer readable media 64, the computing system 54 may include software for controlling the devices and subsystems of the example embodiments, for driving the devices and subsystems of the example embodiments, for enabling the devices and subsystems of the example embodiments to interact with a human user (user interfaces, displays, controls), etc. Such software can include, but is not limited to, device drivers, operating systems, development tools, applications software, etc. A computer readable medium 64 further can include the computer program product(s) for performing all or a portion of the processing performed by the example embodiments. Computer program products employed by the example embodiments can include any suitable interpretable or executable code mechanism, including but not limited to complete executable programs, interpretable programs, scripts, dynamic link libraries (DLLs), applets, etc. The processors 62 can include, or be otherwise combined with, computer-readable media (e.g., the memory 64). Some forms of computer-readable media may include, for example, a hard disk, any other suitable magnetic medium, CD-ROM, CDRW, DVD, any other suitable optical medium, RAM, PROM, EPROM, FLASH-EPROM, any other suitable memory chip or cartridge, a carrier wave, or any other suitable medium from which a computer can read.

As shown in FIG. 2, the receiver unit 36 can also include a network interface 72 for communicating data through one or more networks 74. The network interface 72 may take a variety of forms. For example, the network interface 72 may be a WiFi, WiMax, WiMax mobile, data over cable service interface specification (DOCSIS), wireless, cellular, or other types of interfaces. Moreover, the network interface 72 may use a variety of protocols for communicating via the network 74. For instance, the network interface 72 may communicate using Ethernet, a Transmission Control Protocol/Internet Protocol (TCP/IP), a hypertext transfer protocol (HTTP), or some other protocol.

As described above, the receiver unit 36 can include or be coupled to a display 18. The display device 18 can include, for example, a television, a monitor, a smartphone screen, etc. The display device 18 is configured to display images such as, for example, video, graphics, text, or any variety of other visual representations. In some examples, the display device 18 can further include an audio output, such as one or more speakers, to generate sound waves from media signals received by the display device 18.

To facilitate the display of the television content on the display device 18, the display device 18 can be communicatively coupled to the computing system 54 and/or the signal conditioning devices 52 via the output driver 58. In particular, the output driver 58 can work in conjunction with a graphics processing unit, which can be configured to communicate with the display device 18. As non-limiting examples, the output driver 58 can communicate with the display device 18 via a high-definition multiple interface (HDMI) cable, a coaxial cable, some other wired communication link, or wirelessly.

The user interface 56 is configured to allow a user to interact with the receiver unit 36 via one or more input devices 70. Non-limiting examples of the input device(s) 70 can include a remote control (or more simply, a remote), a keyboard, a computer mouse, one or more push buttons, a touch screen, a smart phone, a tablet PC, a voice activated interface, and/or the like. Accordingly, the user interface 56 can include suitable components for interfacing with the input device(s) 70 such as, for example, an infrared sensor, a USB port, a data port, a network interface (e.g., WiFi, WiMax, WiMax mobile, data over cable service interface specification (DOCSIS), wireless, cellular, or other types of interfaces), motion sensors, image capture devices, etc. Input device 70 may be used, for example, to select a channel, select information, change the volume, change the display appearance, or perform other functions using user interface 56.

In particular, the input device 70 and the user interface 56 can be utilized in connection with the electronic program guide module 68 to facilitate user interactions with the receiver unit 36. The electronic program guide module 68 is configured to cause the display device 18 to display various program guide data to the user relating to the television content of the local channels 17A, 17B and the satellite channels 19. For example, the program guide data can relate to scheduling information, bibliographic information (e.g., title, rating, actors, director), program synopsis information, channel number, network identifier, etc. for current and upcoming television content programming. The program data can further include the relative positions of the program guide data, the line structures for forming a grid for a program guide, and the like. As such, the program guide data can be displayed as a grid-type program guide that informs the user of particular programs that are available on particular channels at particular times.

Additionally, the program guide data can be provided to the user as a plurality of selectable objects, which may be selected by the user using the user input device 70. In response to a user selection, the receiver unit 36 can be tuned to the one channel 17A, 17B, 19 associated with the selected object, immediately or at a subsequently scheduled time, to watch or record the associated television content. Accordingly, the electronic program guide serves the dual purpose of providing the user with information about the television content associated with the channels 17A, 17B, 19 and facilitating user selection of such content and channels.

As described above, the receiver unit 36 is configured to receive one or more of the same local channels 17A, 17B from multiple sources (e.g., the first broadcast system 14 and the second broadcast system 16). Advantageously, however, the program guide module 68 can be configured to present a single set of program guide data for each local channel 17A, 17B. That is, despite a given local channel being separately received by the receiver unit 36 from both the first broadcast system 14 and the second broadcast system 16, the displayed program guide includes only one instance of the associated program guide data for that local channel. For example, in a grid-type program guide, each of the local channels 17A, 17B and the satellite channels 19 may be associated with one row of the program guide (i.e., the same local channel received from multiple sources is not displayed on multiple rows). In this way, the user is presented with a more streamlined program guide that allows for more efficient viewing and selection of television content associated with the channels.

According to some aspects of the present disclosure, although the local channels 17A, 17B are received from multiple sources, the program guide data for all channels 17A, 17*b*, 19 can be received by the receiving system 12 as a single set of program guide data, for example, from the NOC 20 and/or a third-party listings metadata aggregator (e.g., TRIBUNE TV DATA, GEMSTAR-TV GUIDE, etc.). In such implementations, the program guide data can be transmitted to the receiving system 12, for example, via the first broadcast system 12, the second broadcast system 14, and/or the network 74.

According to additional or alternative aspects of the present disclosure, the program guide data can be separately received from multiple sources. For example, a first set of program guide data can received by the receiver unit 36 for the first set of local channels 17A and the satellite channels 19, and a second set of program guide data can be received by the receiver unit 36 for the second set local channels 17B. In such implementations, the program guide module 68 can be configured to process the separately received program guide data to determine and display collective program guide data, which combines or otherwise de-duplicates program guide data for the same local channels (i.e., like local channels) received from multiple sources.

Figure 3:
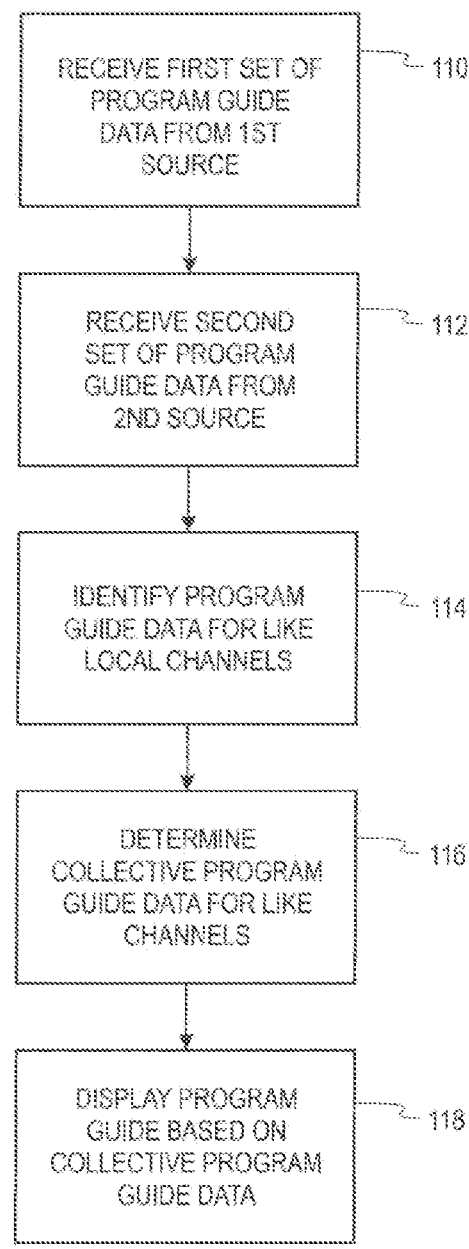
FIG. 3 illustrates an example flowchart of a process for providing a program guide according to aspects of the present disclosure.

FIG. 3 illustrates an example flowchart for a process 100, according to some aspects of the present disclosure, for providing a program guide based on program guide data separately received for one or more of the local channels 17A, 17B from multiple sources. At block 110, a first set of program guide data for a first set of channels (e.g., the local channels 17A and satellite channels 19) is received by the receiver unit 36 from a first source (e.g., the first broadcast system 14). At block 112, a second set of program guide data for a second set of channels (e.g., the local channels 17B) is received by the receiver unit 36 from a second source (e.g., the second broadcast system 16 or the network 74).

At block 114, the program guide module 68 processes the first set of program guide data and the second set of program guide data to identify the program guide data associated with like ones of the first set of channels and the second set of channels. That is, the program guide module 68 determines which of the first set of program guide data and the second set of program guide data is associated with the channels that are received from multiple sources. In one non-limiting example, the program guide data can include identifiers that facilitate the determination of program guide data for like channels by the program guide module 68.

At block 116, the program guide data identified at block 114 is further processed to determine collective program guide data by combining or otherwise de-duplicating the program guide data identified at block 114. In one non-limiting example, the program guide module 68 can be configured to employ a hierarchical analysis scheme that prioritizes one set of program guide data over another for channels received from multiple sources (e.g., prioritizing the first set of program guide data over the second set, or vice versa).

In another non-limiting example, the program guide module 68 can be configured to compare the first set of program guide data and the second set of program guide data on a channel-by-channel basis for the identified like channels and, based on the comparison, select the first set of program guide data or the second program guide data for each identified like channel. For example, the program guide module 68 can select the program guide data determined to be the most detailed based on the comparison.

In yet another non-limiting example, the program guide module 68 can be configured to compare the first set of program guide data and the second set of program guide data for the identified like channels and, based on the comparison, modify either the first set of program guide data or the second set of program guide data. For example, the program guide module 68 can be configured to combine portions of the first set of program guide data and the second set of program guide data. It should be understood that other example implementations can be employed for combining or de-duplicating the program guide data received from multiple sources to achieve the collective program guide data.

At block 118, the collective program guide data is displayed as a program guide on the display device 18 in response to one or more user inputs received via the input devices 70. FIG. 3, described by way of example above, represents one algorithm that corresponds to at least some instructions executed by the processor(s) 62 to perform the above described functions associated with the described concepts. It is also within the scope and spirit of the present disclosure to omit steps, include additional steps, and/or modify the order of steps presented above. It is further contemplated that one or more of the steps presented above can be performed simultaneously.

Additionally, while the process 100 is described as being implemented by the computing system 54 of the receiver unit 36, it should be understood that the collective program guide data can be determined by other devices and systems and provided to the receiver unit 36 according to alternative aspects of the present disclosure. For example, the NOC 20 or a third-party listings metadata aggregator can receive the first set and the second set of program guide data, determine the collective program guide data, and provide the collective program guide data to the receiver unit 36 (as described above) according to alternative aspects of the present disclosure.

Figure 4:
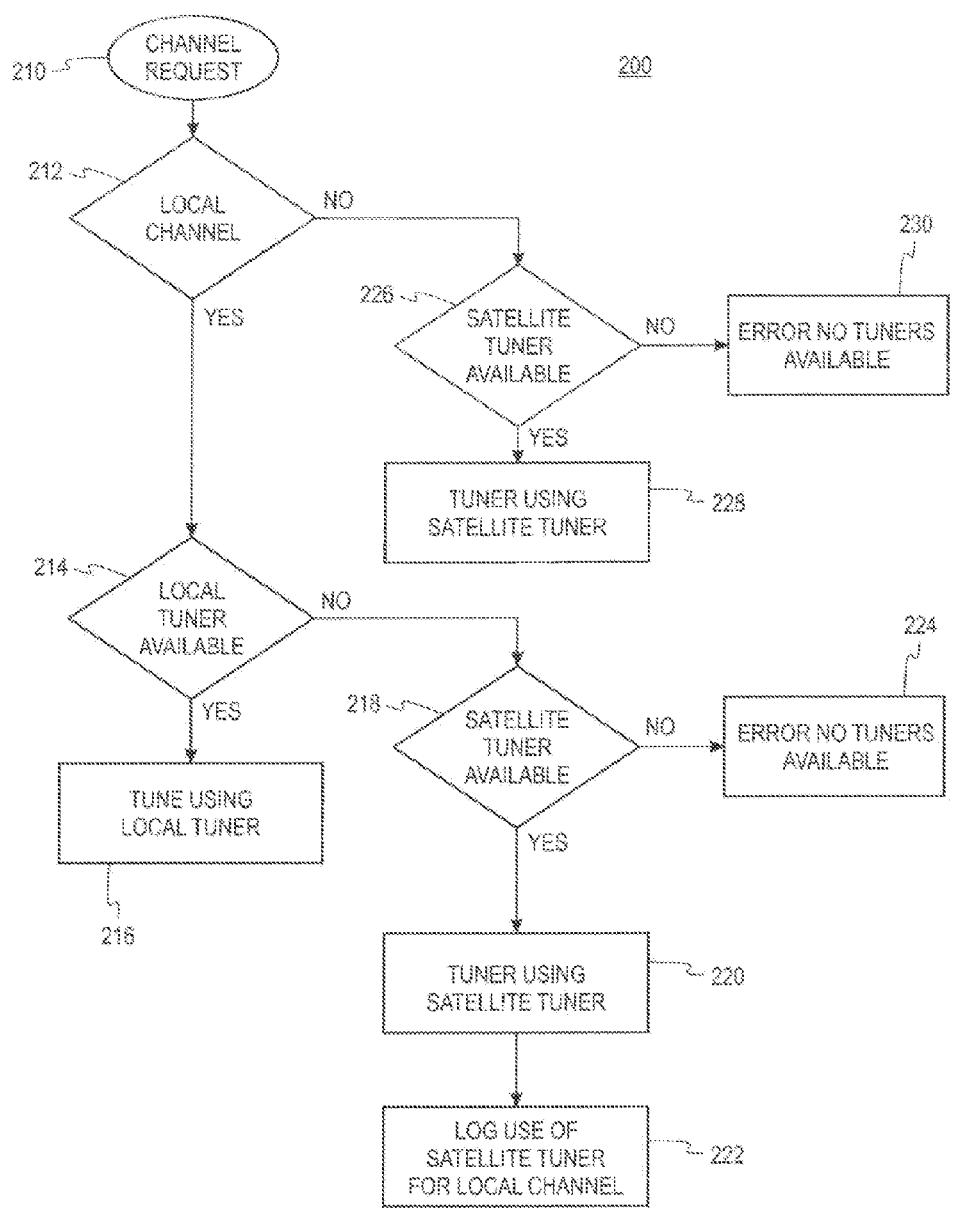
FIG. 4 illustrates an example flowchart of a process for managing television tuners according to aspects of the present disclosure.

Referring now to FIG. 4, an example process 200 for managing television tuners using the tuner management module 60 is illustrated according to some aspects of the present disclosure. At block 210, a request for one of the local channels 17A, 17B or the satellite channels 19 is received. According to some aspects, the channel request can be received in response to an actuation of the input device 70. For example, the channel request can be initiated in response to the user actuating a channel up or a channel down button on a remote control. As another example, the channel request can be initiated in response to a user selection of an object in the program guide using the input device 70. According to additional or alternative aspects, the channel request can be automatically generated by the computing system 54, for example, to display or record a program at a scheduled time. Accordingly, the channel request can generally include a request to watch or record television content on the requested channel.

At block 212, it is determined whether the requested channel is one of the plurality of local channels 17A, 17B. If it is determined that the requested channel is one of the local channels 17A, 17B at block 212, then it is determined whether at least one of the one or more local tuners 50B is available for tuning at block 214. According to some aspects, one of the local tuners 50B is available for tuning if the requested channel is one of the local channels 17B and one of the local tuners 50B is (i) idle or (ii) being used to display television content but not record television content to the DVR 66 at the time of the channel request. In other words, if the requested channel is not one of the local channels 17B that are received by the local tuners 50B or all of the local tuners 50B are being used to record television content to the DVR 66 at the time of the channel request, then none of the local tuners 50B are available.

If it is determined at block 214 that at least one of the one or more local tuners 50B is available for tuning, then the channel request is processed using an available one of the one or more local tuners 50B at block 216. If, however, it is determined that none of the one or more local tuners 50B is available for tuning at block 214, then it is determined whether at least one of the one or more satellite tuners 50A is available for tuning at block 218. According to some aspects of the present disclosure, one of the satellite tuners 50A is available for tuning if the requested channel is one of the local channels 17A and one of the satellite tuners 50A is (i) idle or (ii) being used to display television content but not record television content to the DVR 66 at the time of the channel request. In other words, if the requested channel is not one of the local channels 17A that are received by the satellite tuners 50A or all of the satellite tuners 50A are being used to record television content to the DVR 66 at the time of the channel request, then none of the satellite tuners 50A is available.

If it is determined that at least one of the one or more satellite tuners 50A is available for tuning at block 218, then the channel request is processed using an available one of the one or more satellite tuners 50A at block 220. After the channel request is processed at block 220, the use of the satellite tuner 50A to tune to the requested local channel is logged in a log (e.g., stored in the memory 64) at block 222. The log can provide an audit trail that can be used to determine retransmission fees associated with the use of the local content 17A received from the first broadcast system 14. Accordingly, the log can include information for determining retransmission fees such as, for example, timestamp information, an identification of the channel utilized, an identification of the television program recorded or watched and/or the like. According to some aspects, the log can be transmitted to the NOC 20 via the first broadcast system 14 and/or the network 74 to facilitate the determination of retransmission fees to be paid to the content providers 22.

On the other hand, if it is determined that none of the one or more satellite tuners 50A is available for tuning at block 218, then an error signal is generated by the computing system 54 at block 224. In one non-limiting example, the error signal can cause a message to be displayed on the display device 18 to inform the user that none of the tuners 50A, 50B are available to process the channel request. In another non-limiting example, the error signal can cause the display of a prompt providing the user with options for cancelling a current recording to free up one of the tuners 50A, 50B to allow the receiver unit 36 to process the channel request. The user's decision in response to the prompt can be received, for example, via the input device 70.

If it is determined that the requested channel is one of the plurality of satellite channels 19 at block 212, then it is determined whether at least one of the one or more satellite tuners 50A is available for tuning at block 226 (as described above for block 218). If it is determined at least one of the one or more satellite tuners 50A is available for tuning at block 226, then the channel request is processed using an available one of the one or more satellite tuners 50A at block 228. If it is determined that none of the one or more satellite tuners 50A is available for tuning at block 226, then the error signal is generated by the computing system 54 at block 230.

In the example process 200 described above, a given one of the tuners 50 is considered to be available if the tuner 50 receives the requested channel and the tuner 50 is (i) idle or (ii) being used to display television content but not record television content to the DVR 66 at the time of the channel request. According to additional or alternative aspects, the determinations as to whether one of the tuners 50 is available at blocks 214, 218, and/or 226 can consider other scenarios as well. As one non-limiting example, the determinations as to whether one of the tuners 50 is available can take into consideration upcoming, scheduled channel requests. In other words, the determinations at blocks 214, 218, and/or 226 can include a determination as to whether sufficient tuners 50 would be available at a later time to process another previously scheduled channel request if the current channel request was processed. For instance, if a channel request was received at 11:30 am to record an hour long program and one of the tuners 50 was idle but all tuners 50 were scheduled to record various channels starting at noon, the tuners 50 can be considered to be unavailable to process the channel request due to the conflict with the previously scheduled recordings. However, in such an example, if there was a conflict with one or more previously scheduled recordings, the error signal generated at blocks 230 or 224 can cause the display of selectable options which prompt the user to choose between the current channel request and one or more of the later scheduled channel requests.

In other non-limiting examples, a given tuner 50 can be considered to be available only if it is idle. That is, if the tuner 50 is being utilized to display television content or record television content at the time of the channel request, the tuner 50 can be considered to be unavailable. One example implementation for such examples is a situation in which the receiver unit 36 is being utilized to display television content on more than one display device 18 at the same time (i.e., to display different channels 17A, 17B, 19 on different display devices 18 simultaneously). In such implementations, the error signal generated at blocks 230 or 224 can cause the display of selectable options which prompt the user to select among the different television content on the display devices 18 such that the television content of the channel request can be displayed instead of the selected television content.

FIG. 4, described by way of example above, represents one algorithm that corresponds to at least some instructions executed by the processor(s) 62 to perform the above described functions associated with the described concepts. It is also within the scope and spirit of the present disclosure to omit steps, include additional steps, and/or modify the order of steps presented above. It is further contemplated that one or more of the steps presented above can be performed simultaneously.

The systems and methods of the present disclosure provide a number of significant advantages over prior television systems. In particular, the systems and methods of the present disclosure more efficiently manage tuner resources and reduce retransmission fees. Additionally, unlike prior systems, the systems and methods of the present disclosure require little or no input from the user as to which tuner should be utilized to tune to a requested channel. For example, if a requested channel is selected by the user and one of the tuners 50 is available, an available tuner 50 is automatically assigned to tune to the requested channel without requiring any user input or otherwise disrupting the channel selection process.

By more optimally managing tuner resources as described herein, the systems and methods of the present disclosure can also provide an improved user interface for a program guide. Past systems attempting to provide channels from two different sources provided a program guide that included multiple program guide objects for any channels that were received from multiple sources. For example, if a local channel was received from an over-the-air antenna and the same local channel (i.e., a like channel) was received from a satellite antenna, the program guide grid included two rows of objects—one for each instance of that same local channel received (e.g., if a channel X was received from the satellite antenna 38 and the over-the-air antenna 44, the program guide would display two rows for the channel X).

Additionally, in such past systems, each program guide object was associated with only one source. As such, if the user selected an object for a local channel received via the over-the-air antenna 44, only one of the local tuners 50B could be utilized to tune to the requested channel. On the other hand, if the user selected an object for the same local channel received via the satellite antenna 38, only one of the satellite tuners 50A could be utilized to tune to the requested channel. Thus, prior attempts to provide local channels 17A, 17B from multiple sources not only presented duplicate information for the local channels 17A, 17B in the program guide, but user selections were inefficiently handled only by a dedicated tuner 50A or 50B fixedly associated with the program guide objects. For example, in prior systems, if a user selected an object for a local channel received from the over-the-air antenna 38 but no local tuners 50A were available, the user's request could not be processed regardless of whether any satellite tuners 50B were available.

The systems and methods of the present disclosure overcome such deficiencies. As described above, because the tuner management module 60 can assess tuner 50 resources and assign available ones of the tuners 50 to process channel requests, a common set of program guide data can be presented to the user to facilitate requests for channels received from multiple sources. That is, the program guide of the present disclosure can more efficiently display information for each channel once independently of the source of the channel (i.e., the program guide objects are not fixedly associated with only satellite tuners 50A or only the local tuners 50B for the local channels 17A, 17B received from multiple sources). The program guide of the present disclosure thus provides a significantly improved user experience.

Additionally, as described above, the systems and methods of the present disclosure provide significant advantages in that retransmission fees can be reduced. In particular, retransmission fees can be reduced by using the local tuners 50A when possible to display and/or record the local channels 17A. Yet, allowing the system 10 to utilize the satellite tuners 50B when the local tuners 50A are unavailable, the system 10 can simplify and streamline the user experience.

According to some aspects, the retransmission fees can be negotiated on a periodic basis between the broadcast companies (e.g., the local content sources 42) and the subscription television source (e.g., a satellite television company). In such instances, the retransmission fees may be negotiated based on the information logged (e.g., at block 222 in FIG. 4) across the entire subscriber base (i.e., all users) for a given period of time. Thus, by reducing the number of uses of the satellite tuners 50A for the local channels 17A, the number of logged uses by the subscriber base is reduced, which in turn allows the subscription television source to negotiate for lower retransmission fees.

According to additional or alternative aspects of the present disclosure, the retransmission fees can be based on a per use fee. In such instances, the retransmission fees are more directly correlated to the logged uses of the satellite tuners 50A to tune to the local channels 17A. In either case, the systems and methods of the present disclosure advantageously reduce retransmission fees by reducing the use of the satellite tuners 50A to tune to the local channels 17A.

It should be understood that the systems and methods illustrated and described above with respect to FIGS. 1-4 are example implementations, which may be modified in various ways, according to additional or alternative aspects of the present disclosure. For example, in the system 10 illustrated and describe above for FIG. 1, the satellite tuners 50A and the local tuners 50B can be all provided in a single device (i.e., a common housing for the receiver unit 36). However, according to additional or alternative aspects, at least one of the satellite tuner(s) 50A and/or at least one of the local tuner(s) 50B can be provided in a separate device. For example, the receiver unit 36 can include a host device and an external, peripheral device couplable to the host device via, e.g., a USB, Ethernet, HDMI, etc. connection. The host device can include a first portion of the tuners 50 and the external, peripheral device can include a second portion of the tuners 50. In one non-limiting example implementation, the satellite tuners 50A can be provided in the host device and the local tuners 50B can be provided in the peripheral device. In this way, existing systems that include only satellite tuners 50A can be retrofitted with an add-on component including the local tuners 50B and aspects of the computing system 54 to allow such existing systems to achieve the advantages of the present disclosure.

Additionally, for example, the first television broadcast system 14 is a satellite television broadcast system and the second television broadcast system 16 is a terrestrial, over-the-air television broadcast system in the illustrated example; however, as described above, the first broadcast system 14 and/or the second broadcast system 16 can be implemented using other types of television broadcast systems according to additional or alternative aspects of the present disclosure. Other suitable subscription television systems can include, for example, wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. According to such additional or alternative aspects, the satellite channels 19 can be more generally considered to be subscription channels 19 and the associated satellite tuner(s) 50B can be more generally considered to be subscription tuner(s) 50B. Thus, according to such additional or alternative aspects, the local tuners 50B receive the local channels 17B via the second broadcast system 16 (such as any of those described above), and the subscription tuners 50B receive the local channels 17A and the subscription channels 19 via the first broadcast system 14 (such as any of those described above).

As a further example of an alternative broadcast system that can be employed according to additional or alternative aspects of the present disclosure, the satellite 24 can be replaced with another high altitude device such as a stratospheric platform such as, for example, manned or unmanned airplanes, airships, or the like that fly above commercial airspace, e.g., at altitudes between 60,000 and 100,000 feet from the surface of the earth. Thus, the stratospheric platforms are in a significantly lower position than even low earth orbit satellites.

While the above disclosure is made with respect to the delivery of television content (e.g., television (TV), movies, games, music videos, etc.), it should be understood that the systems and methods disclosed herein could also be used for delivery of other media content type, for example, audio, music, data files, web pages, games, etc. according to additional or alternative aspects of the present disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method comprising:
    receiving, by a television receiving system, a request to tune to a first channel of a plurality of television channels including one or more local channels and one or more satellite channels;
    determining whether the first channel is one of the one or more local channels;
    if it is determined that the first channel is one of the one or more local channels, then tuning to the first channel, using a tuner selected from one or more local tuners and one or more satellite tuners according to a hierarchy that prioritizes the one or more local tuners over the one or more satellite tuners, by:
        determining whether at least one of the one or more local tuners is available for tuning;
        if it is determined that at least one local tuner is available for tuning, then tuning to the first channel using an available one of the one or more local tuners; and
        only if it is determined that none of the one or more local tuners are available for tuning, then tuning to the first channel using an available one of one or more satellite tuners.

2. The method of claim 1, further comprising, if it is determined that none of the one or more local tuners are available, determining whether at least one of the one or more satellite tuners is available for tuning.

3. The method of claim 2, further comprising generating an error signal if it is determined that none of the one or more local tuners and none of the one or more satellite tuners are available for tuning.

4. The method of claim 1, further comprising:
    if it is determined that the first channel is not one of the one or more local channels, determining whether at least one of the one or more satellite tuners is available for tuning; and
    if it is determined that the first channel is not one of the one or more local channels and at least one of the one or more satellite tuners is available for tuning, tuning to the first channel using an available one of the one or more satellite tuners.

5. The method of claim 4, further comprising generating an error signal if it is determined that the first channel is not one of the one or more local channels and none of the one or more satellite tuners are available for tuning.

6. The method of claim 1, further comprising, if the first channel is one of the one or more local channels and the available one of the one or more satellite tuners is used to tune to the first channel, logging in memory the use of the available one of the one or more satellite tuners to tune to the first channel.

7. The method of claim 1, further comprising:
    receiving the one or more local channels from an over-the-air antenna;
    receiving the one or more local channels and the one or more satellite channels from a satellite antenna; and
    generating an electronic program guide for display on a display device, the electronic program guide including a plurality of selectable options for displaying program guide data related to the plurality of television channels, the one or more local channels received from the over-the-air antenna and the satellite antenna being associated with a common set of the plurality of selectable options.

8. The method of claim 7, further comprising:
    receiving a first set of program guide data for the one or more local channels received from the over-the-air antenna;
    receiving a second set of program guide data for the one or more local channels and the one or more satellite channels received from the satellite antenna; and
    determining a set of collective program guide data based on the first set and the second set of program guide data, the collective program guide data combining or de-duplicating the first set and second set of program guide data for like ones of the one or more local channels received from the over-the-air antenna and the one or more local channels received from the satellite antenna, the plurality of selectable options displaying the collective program guide data.

9. A system for television tuner management comprising:
one or more satellite tuners configured to receive a plurality of television channels from a satellite antenna, the plurality of television channels including one or more local channels and one or more satellite channels;
one or more local tuners configured to receive the one or more local channels from an over-the-air antenna;
one or more processors; and
one or more memory storing program instructions, which when executed by the one or more processors, cause the system to:
receive a request to tune to a first channel of the plurality of television channels;
determine whether the first channel is one of the one or more one local channels; and
if it is determined that the first channel is one of the one or more local channels, tune to the first channel using a tuner selected from one or more local tuners and one or more satellite tuners according to a hierarchy that prioritizes the one or more local tuners over the one or more satellite tuners,
wherein, to tune to the first channel, the instructions further cause the system to:
determine whether the at least one of the one or more local tuners is available for tuning;
if it is determined that at least one local tuner is available for tuning, then tune to the first channel using an available one of the one or more local tuners; and
only if it is determined that none of the one or more local tuners are available for tuning, then tune to the first channel using an available one of the one or more satellite tuners.

10. The system of claim 9, wherein the instructions further cause the system to determine whether at least one of the one or more satellite tuners is available for tuning if it is determined that none of the one or more local tuners are available.

11. The system of claim 10, wherein the instructions further cause the system to generate an error signal if it is determined that none of the one or more local tuners and none of the one or more satellite tuners are available for tuning.

12. The system of claim 9, wherein the instructions further cause the system to:
if it is determined that the first channel is not one of the one or more local channels, determine whether at least one of the one or more satellite tuners is available for tuning; and
if it is determined that the first channel is not one of the one or more local channels and at least one of the one or more satellite tuners is available for tuning, tune to the first channel using an available one of the one or more satellite tuners.

13. The system of claim 12, wherein the instructions further cause the system to generate an error signal if it is determined that the first channel is not one of the one or more local channels and none of the one or more satellite tuners are available for tuning.

14. The system of claim 9, wherein the instructions further cause the system to log, in the one or more memories, the use of the available one of the one or more satellite tuners to tune to the first channel if the first channel is one of the one or more local channels and the available one of the one or more satellite tuners is used to tune to the first channel.

15. The system of claim 9, wherein the instructions further cause the system to:
receive the one or more local channels from an over-the-air antenna;
receive the one or more local channels and the one or more satellite channels from a satellite antenna; and
generate an electronic program guide for display on a display device, the electronic program guide including a plurality of selectable options for displaying program guide data related to the plurality of television channels, the one or more local channels received from the over-the-air antenna and the satellite antenna being associated with a common set of the plurality of selectable options.

16. The system of claim 9, wherein the over-the-air antenna is incorporated into the same device as the satellite antenna.

17. The system of claim 9, wherein the one or more satellite tuners are disposed in a first set-top-box and the one or more local tuners are disposed in a peripheral device that is communicatively coupled to the first set-top-box.

18. A system for television tuner management comprising:
one or more subscription tuners configured to receive a plurality of television channels from a first television broadcast system, the plurality of television channels including one or more local channels and one or more subscription channels;
one or more local tuners configured to receive the one or more local channels from a second television broadcast system different from the first television broadcast system;
one or more processors; and
one or more memory storing program instructions, which when executed by the one or more processors, cause the system to:
receive a request to tune to a first channel of the plurality of television channels;
determine whether the first channel is one of the one or more one local channels;
responsive to a determination that the first channel is one of the one or more local channels, determine whether at least one of the one or more local tuners is available for tuning;
responsive to a determination that at least one local tuner is available for tuning, then tune to the first channel using an available one of the one or more local tuners;
responsive to a determination that none of the one or more local tuners are available for tuning, then determine whether at least one of the one or more subscription tuners is available for tuning;
responsive to a determination that none of the one or more local tuners are available and at least one of the one or more subscription tuners is available for tuning, then tune to the first channel using an available one of the one or more subscription tuners; and
responsive to a determination that none of the one or more local tuners and none of the one or more subscription tuners is available for tuning, then generate an error signal,
wherein the system does not tune to the first channel via the one or more subscription tuners if at least one of the one or more local tuners is available for tuning to the first channel.

19. The system of claim 18, wherein the first television broadcast system is a cable television system, the one or more subscription channels are one or more cable channels, and the one or more subscription tuners are one or more cable tuners.

20. The system of claim 18, wherein the error signal causes one or more selectable options to be displayed on a display device to allow at least one of the one or more local tuners and the one or more subscription tuners to be made available.

* * * * *